(12) United States Patent
Zee et al.

(10) Patent No.: US 8,582,444 B2
(45) Date of Patent: Nov. 12, 2013

(54) METHOD FOR DETECTING HARDWARE FAULTS BY DETERMINING A RATIO OF RELEASED CONNECTIONS

(75) Inventors: Oscar Zee, Stockholm (SE); Tomas Norling, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 271 days.

(21) Appl. No.: 13/058,069

(22) PCT Filed: Aug. 28, 2008

(86) PCT No.: PCT/SE2008/050973
§ 371 (c)(1),
(2), (4) Date: Feb. 8, 2011

(87) PCT Pub. No.: WO2010/024744
PCT Pub. Date: Mar. 4, 2010

(65) Prior Publication Data
US 2011/0188382 A1 Aug. 4, 2011

(51) Int. Cl.
*G01R 31/08* (2006.01)
(52) U.S. Cl.
USPC .............. 370/242; 370/252; 370/216; 714/25
(58) Field of Classification Search
None
See application file for complete search history.

(56) References Cited

U.S. PATENT DOCUMENTS

| 2004/0083408 A1 | 4/2004 | Spiegel et al. | |
|---|---|---|---|
| 2009/0052330 A1* | 2/2009 | Matsunaga et al. | 370/242 |

FOREIGN PATENT DOCUMENTS

| EP | 0 422 795 A2 | 4/1991 |
|---|---|---|
| EP | 1 259 086 A1 | 11/2002 |
| EP | 1 887 819 A1 | 2/2008 |
| JP | 2006-340050 A | 12/2006 |
| JP | 2009-182538 A | 8/2009 |

OTHER PUBLICATIONS

Japanese Office Action and English Summary for Patent Application No. 2011-524935, Oct. 19, 2012.
International Search Report, PCT Application No. PCTSE2008/050973, Mar. 17, 2009.

\* cited by examiner

*Primary Examiner* — Bob Phunkulh
(74) *Attorney, Agent, or Firm* — Myers Bigel Sibley & Sajovec, P.A.

(57) ABSTRACT

The present invention provides a method of detecting a faulty network element in a network, the network comprising at least a plurality of first network elements having a first network element type, and at least a plurality of second network elements having a second network element type. The method comprises the steps of: a) selecting one of the plurality of first network elements and one of the plurality of second network elements; b) attempting to set up a connection between said selected first network element and said selected second network element; c) repeating steps a) and b) for further selected first and second network elements; d) for each of the plurality of first network elements and for each of the plurality of second network elements, counting a number of connections that are released as the result of a fault; and e) for a particular one of the first or second network elements, on the basis of said number of connections that are released in said particular network element as a result of a fault, determining whether said particular network element is faulty.

17 Claims, 6 Drawing Sheets

METHOD FOR DETECTING HARDWARE FAULTS BY DETERMINING A RATIO OF RELEASED CONNECTIONS

CROSS REFERENCE TO RELATED APPLICATION

This application is a 35 U.S.C. §371 national stage application of PCT International Application No. PCT/SE2008/050973, filed on 28 Aug. 2008, the disclosure and content of which is incorporated by reference herein in its entirety. The above-referenced PCT International Application was published in the English language as International Publication No. WO 2010/024744 A1 on 4 Mar. 2010.

TECHNICAL FIELD

The present invention relates to a method of detecting faults in hardware, and particularly, but not exclusively, to detecting faults in hardware in a network.

BACKGROUND

Fault detection is a common problem in networks and network-like systems.

Figure 1:
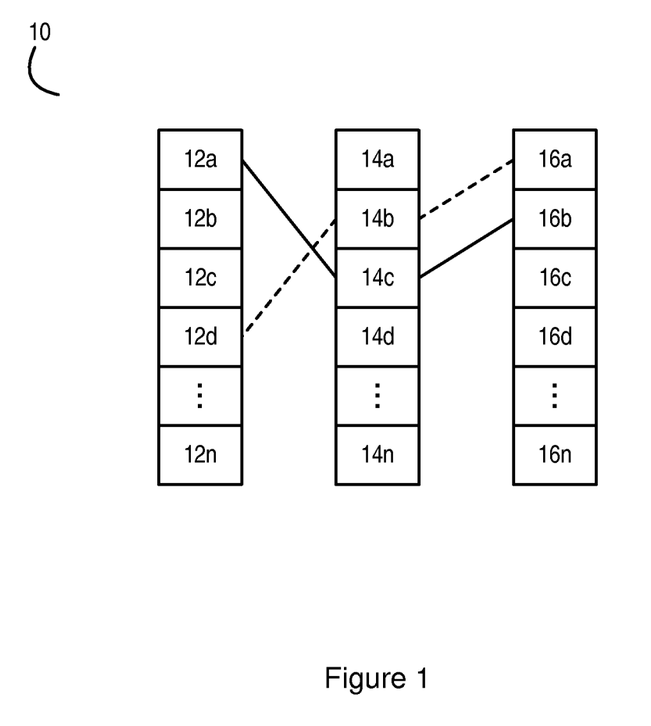
FIG. 1 is a schematic illustration of a system which utilizes dynamic hardware resource allocation.

FIG. 1 shows an example of such a system 10. The system 10 comprises three different element types: a first plurality of elements having a first element type 12a . . . 12n; a second plurality of elements having a second element type 14a . . . 14n; and a third plurality of elements having a third element type 16a . . . 16n.

In operation of this exemplary system 10, the functionality of each element type is required for a particular task to be carried out. An example is illustrated by the solid line in FIG. 1. First element 12a performs a task, and generates an output for element 14c. Then element 14c in turn performs a task and generates an output for element 16b. Thus, a path is established between these three elements 12a, 14c, 16b.

It may also be the case that a functional path may be established which uses more than one element of the same element type. For example, a path may be established between elements 12a, 14c, 14d, and 16b (not illustrated in FIG. 1).

An advantage of this system 10 is that the plurality of elements of each element type allows different paths to be selected at will. An alternative path is shown by the dashed line in FIG. 1, using elements 12d, 14b and 16a. In practice, paths between elements are dynamically selected to allow optimal utilization of those elements.

An example of such a system is a multi-standard base station. In such base stations, hardware is pooled between standards, and there is no hard relationship between the logical resources. Instead, connections between resources are dynamically established and then may be dropped once a particular function has been completed.

A problem with such dynamic hardware allocation is fault detection. In the example shown by the dashed line in FIG. 1, if element 14b is faulty, the entire functionality of the path represented by the elements 12d, 14b, 16a will be lost. A user of the system then has no information to establish which element of the path is faulty.

A system with just one faulty element therefore exhibits erratic faulty behaviour, according to how often the faulty element is selected in a functional path, and it is difficult to accurately identify the faulty element.

SUMMARY OF INVENTION

According to a first embodiment of the present invention, there is provided a method of detecting a faulty network element in a network, the network comprising at least a plurality of first network elements having a first network element type, and at least a plurality of second network elements having a second network element type. The method comprises the steps of:

a) selecting one of the plurality of first network elements and one of the plurality of second network elements;
b) attempting to set up a connection between said selected first network element and said selected second network element;
c) repeating steps a) and b) for further selected first and second network elements;
d) for each of the plurality of first network elements and for each of the plurality of second network elements, counting a number of connections that are released as the result of a fault; and
e) for a particular one of the first or second network elements, on the basis of said number of connections that are released in said particular network element as a result of a fault, determining whether said particular network element is faulty.

Thus, one embodiment is concerned with identifying a faulty element in a network. By attempting to establish connections between the different elements, and counting the number of connections that are lost (i.e. released or dropped, etc) in each element as the result of a fault, the faulty element can be identified. The faulty element will generally have a far higher count of the number of connections dropped as the result of a fault. The method may be performed by a central management node, or by the elements themselves.

In this latter embodiment, an element can determine itself whether it is faulty by also maintaining a count of the overall number of dropped connections (i.e. not just those dropped as the result of a fault). If the ratio of the two counts is equal or close to 1, the element can be identified as being faulty.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Since the most common method for recovery of functionality when problems occur is release of the functionality, we can use these "fault recovery releases" as indicators to discover resource, or element, failure. This is done by introducing "fault recovery release counters" for different recovery releases on each resource unit (or element, etc). Each time when a "fault recovery release" is initiated, the counter for that recovery type on the resources which are involved in that release will be increased.

If the fault is caused by an error in a resource unit, after a certain number of fault recovery releases, the "fault recovery release counter" on that resource unit will have a much higher value than other resource units. This may be measured by, for example, comparing the average value of the "fault recovery release counter" for all resource units and the counter value for each individual resource unit. If the difference exceeds a certain threshold, the faulty unit can then be pin-pointed.

Therefore, according to the present invention, a count is maintained for each element of the number of functional paths that are dropped (or released) in that network element as a result of a fault. The count may be maintained locally to the element, or remotely as a result of signalling from the element.

Figure 2:
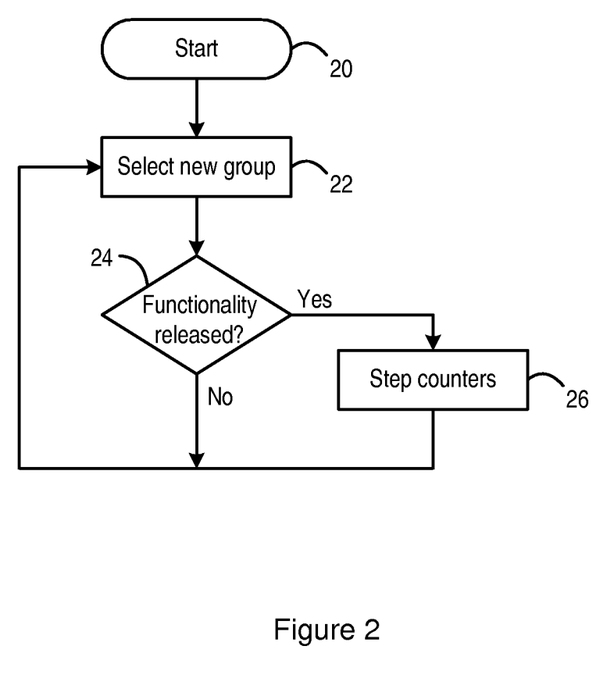
FIG. 2 is a flowchart of a method in accordance with the present invention.

FIG. 2 is a flowchart of a method in accordance with the present invention.

The method starts at step 20, and proceeds to step 22, where a new path, or group, of elements is selected, i.e. two or more elements are grouped together to perform a combined task. In one embodiment, this selection is random; in another embodiment, the selection is based on a predetermined selection pattern that ensures each path is selected a substantially equal number of times. For example, the predetermined selection pattern may be such that all possible paths are selected in sequence. The advantage of both these embodiments is that each path is selected a substantially equal number of times over a long period of time. In this way, short-term statistical fluctuations are minimized. Further, other so-called "smart" algorithms may avoid selecting the faulty element and so skew the analysis.

The random or predetermined selection may be initiated as the result of the system 10 being put into "test mode", or similar. Of course, the invention can also be used during normal use of the system.

Once the path has been selected, it is determined in step 24 whether the functionality of the path, or group, of elements has been released as the result of a fault (i.e. because one or more elements in the path or group are faulty). For example, the functionality of the group may have been dropped altogether, or dropped and then restarted.

If the functionality is not released, the method moves back to step 22, and a new path is selected. If the functionality is released, the process moves to step 26, and a fault release count of each element in the faulty path, or group, is stepped by one increment. The process then moves back to step 22, and a new path is selected. This method has been described in an essentially linear form, with a path or group being selected, and its functionality tested before another path or group is selected. However, in other embodiments, two or more paths or groups may be selected and tested at the same time. That is, there is no requirement that one path or group is tested before another path or group is selected. In fact, more than one process may be running in parallel.

It will also be apparent to those skilled in the art that, although the above description has concentrated on a "path" being formed between elements, more generally the present invention is applicable to any group of elements that are grouped together to perform a function. That is, it is not necessary for one element to generate an output, pass that output to the next element in the "path", and so on in a linear manner. Rather, the elements in any group may be combined together to perform a task jointly, or two or more elements in the group may perform tasks in parallel. In such groups or paths, if one element is faulty, the combined functionality of the group will be released due to the faulty element.

Thus, according to the method described above, statistics are generated for each element in the system 10.

A further step in the method according to the present invention is to use these statistics to identify which of the elements in the system, if any, is faulty. This step will be described in greater detail below.

Figure 3:
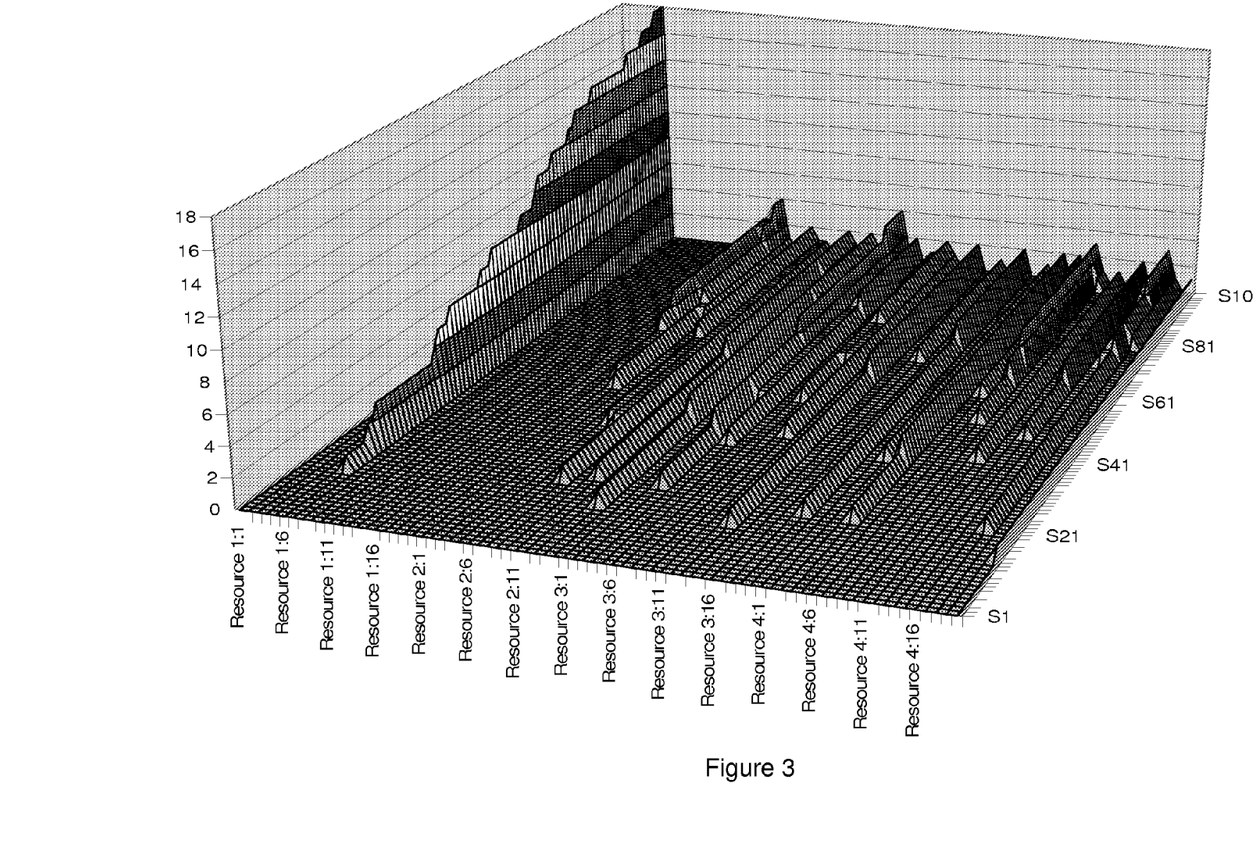
FIG. 3 is a graph of statistics collected in a system according to one embodiment of the present invention.

FIG. 3 is a graph showing the increase in the fault release count values for each element over the course of time, i.e. showing the statistical analysis that is generated substantially according to the method described above.

The graph was generated using computer simulation, and used the following input values. The exemplary system has four element types (labelled "resource type" in FIG. 3), with 20 elements in element types 1, 3 and 4, and 15 elements in element type 2. These are labelled on the x-axis as "element type.element number". The y-axis shows iteration number. The z-axis shows the current value of the fault release count.

Other values are:
10 users.
Probability that a user will set up a functional path on each iteration=0.6.
Probability that a user will release a functional path on each iteration=0.8.
Random element allocation.
One faulty element in element type 1.

As can be seen from the graph, the fault release count for one particular element in element type 1 is markedly higher than the rest of the elements, and this element is therefore identified as the faulty element. This is because every functional path that is set up using that element increases its fault release count (i.e. the functional path is released). In the other elements, the fault release counts are only increased when they are used on a functional path which includes the faulty element.

It is also to be noted that in this example the fault release count for all other elements in element type 1 is zero.

Figure 4:
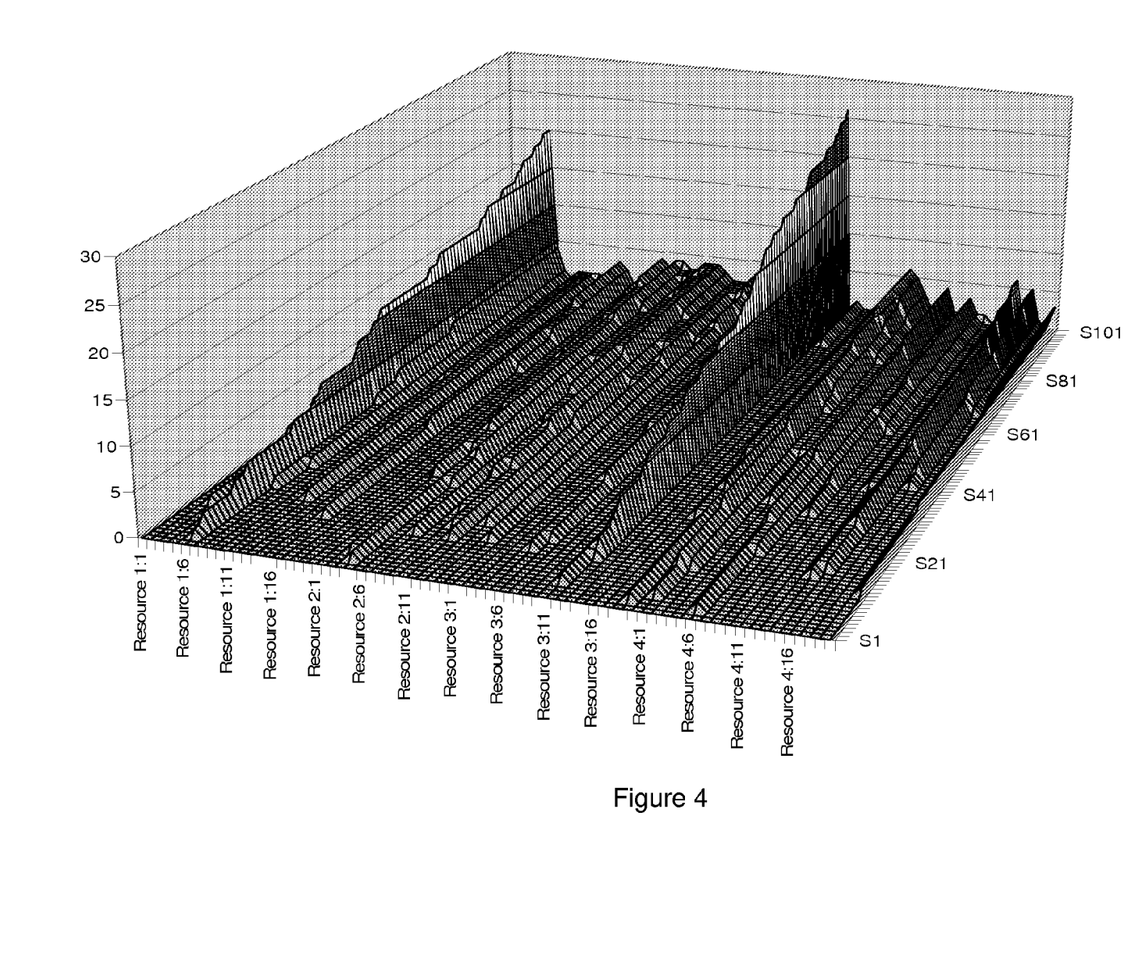
FIG. 4 is a graph of statistics collected in a system according to another embodiment of the present invention.

FIG. 4 is a graph of computer-simulated statistics for a system in which there is one faulty element in element type 1, and one faulty element in element type 3. Otherwise, the values and inputs are the same as for the example described with respect to FIG. 3.

As can be seen, again the fault release count values for the two faulty elements are markedly higher than for the other elements. In this example, the "noise floor" is slightly higher than the example with just one faulty element, and in particular the fault release counts for other elements in element types 1 and 3 are not zero. However, the faulty elements are still clearly discernible.

Therefore, various methods exist for identifying faulty elements in the system. According to one embodiment, the element with the highest fault release count is identified as the faulty element. According to an alternative embodiment, an average value of the fault release counts of all the elements in the system is determined, and the fault release count value for each individual element compared with that average.

If the individual fault release count exceeds the average by a threshold value (for example, by a percentage or an absolute number), then that element is identified as being faulty. The latter embodiment has the advantage that more than one element can be identified as being faulty.

The average may be determined in a number of ways, as will be apparent to a person skilled in the art. In one embodiment, the values for all the fault release counters of elements in a single element type are summed and divided by the number of elements of that element type. In another embodiment, the values for all the fault release counters are summed and divided by the total number of elements.

The methods described above can be performed anywhere. They may be performed in one or more of the elements themselves in the system, if those elements have knowledge of the fault release count values for other elements (for example, the other elements having the same element type, or all the elements in the network). Alternatively, an external device may be used to collate the statistics and to identify faulty devices. In either case, some mechanism should exist for communicating to the identifying device (whether an element or not) either the current fault release count value or whether a connection was released as the result of a fault, so the identifying device can itself maintain the fault release count. The person skilled in the art may think of many ways of achieving this. In the example of a telecommunications network, each element may signal to the external unit or the identifying element by means of a new message, or by adapting an existing standardized message to communicate the information.

Figure 5:
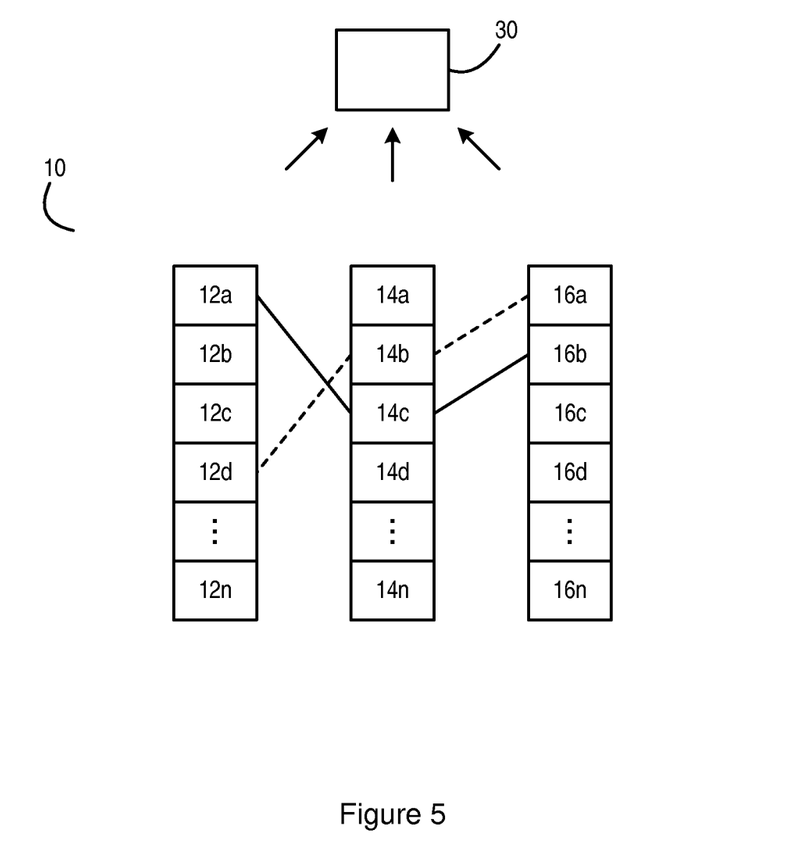
FIG. 5 is a schematic illustration of a system in accordance with an aspect of the present invention.

FIG. 5 illustrates a system, or network, in accordance with this aspect of the present invention, whereby an external device, or central management node 30 is adapted to perform the method identifying a faulty element within the system, or network 10.

As described above, the external device 30 is adapted to receive messages from the elements 12, 14, 16, and thereby to identify a faulty element in the system 10. In one embodiment, those messages comprise the present respective fault release count for each element; the external device can then use these fault release counts to identify the presence, if any, of a faulty element. In another embodiment, those messages comprise information indicating whether a functionality was released as the result of a fault. The external device 30 can therefore itself maintain the fault release count for each element 12, 14, 16, and subsequently identify the presence, if any, of a faulty element.

In a further aspect of the present invention, an element can itself determine whether it is faulty or not. That is, the preceding aspect requires knowledge of the fault release count values of all elements in the system to determine whether an element is faulty or not.

According to the further aspect of the invention, each element also maintains a count of all connections that are released in that element, whether as the result of a fault or not. That is, in general there are many reasons why a connection may be released, including the function performed by the functional path being completed.

However, in a faulty element all, or almost all, connection releases are the result of a fault. Therefore, according to one embodiment, each element determines a ratio of connections released as a result of a fault to total connections released. If this is equal to 1, then the element can determine that it is faulty.

If the fault on the device is intermittent, the ratio may not be exactly equal to 1. Therefore, in another embodiment, the device may determine that it is faulty if the ratio is above a threshold value (for example, 0.95).

Figure 6:
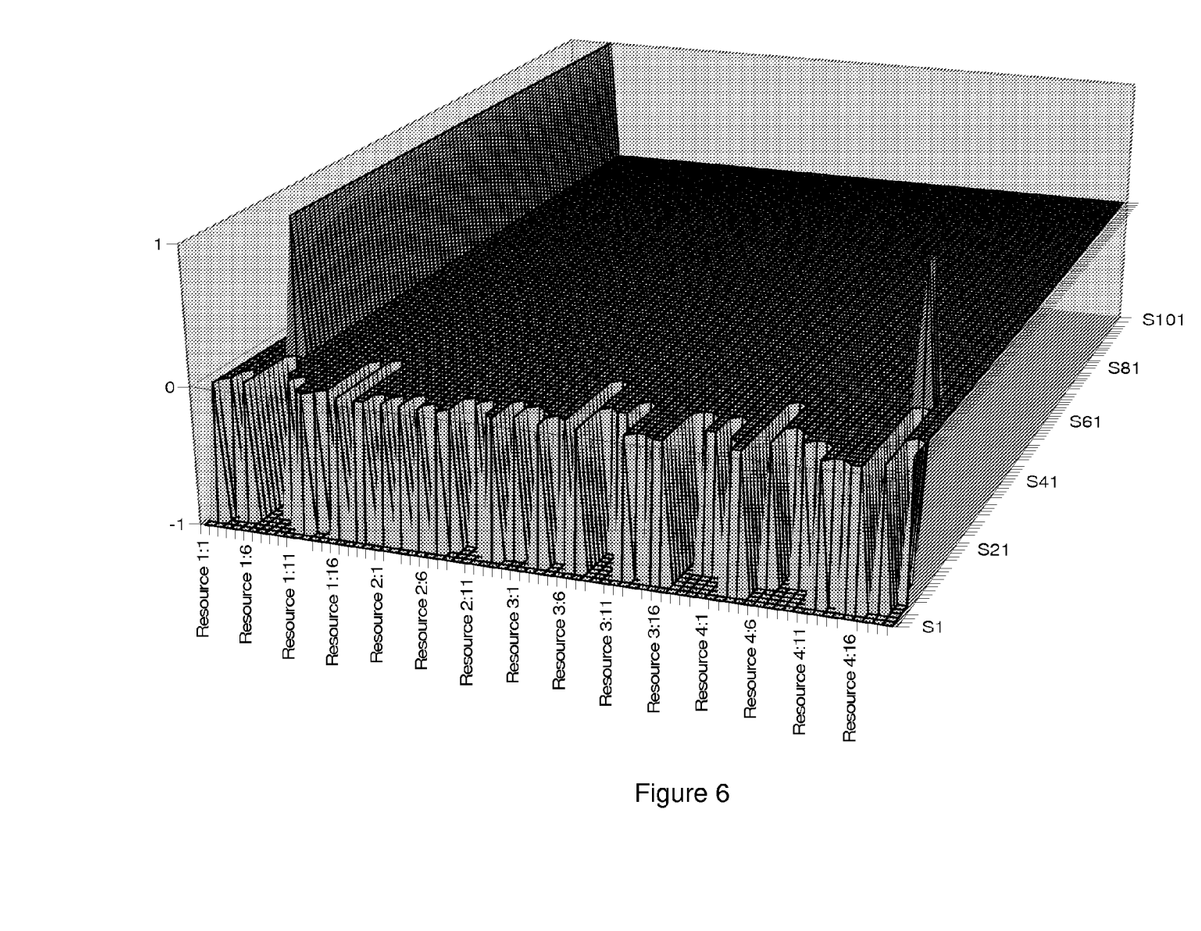
FIG. 6 is a graph of statistics collected in a system according to a yet further embodiment of the present invention.

FIG. 6 shows a graph illustrating statistics for a system in which each element determines a ratio as described above. The input values are the same as for FIG. 3 above, with one faulty element in element type 1. The z-axis illustrates the value of the ratio, with a ratio value of −1 showing that no functional paths have so far been established with that element, and therefore no data has accumulated.

As can be seen, the ratio of one element rapidly converges to 1, whilst the ratio of the other elements rapidly converges to 0. Therefore, the element in element type 1 with the ratio of 1 is identified as the faulty element.

As mentioned above, this aspect has the advantage that each element can determine itself whether it is faulty, without knowledge of the counter values of other elements. That is, this aspect does not require an external device, or central management node 30. However, as shown in FIG. 6, initially on some elements the ratio may equal 1 even if those elements are not faulty, thus triggering a false alarm. This will occur if the first connection on which an element is set up includes a faulty element. This can be overcome by including a further requirement that an element is only identified as being faulty if the ratio is still equal to, or close to being equal to, 1 after a certain number of total released connections.

The exemplary systems and methods described above each have three or four element types. However, it will be understood by those skilled in the art that any number of element types equal to or greater than two is contemplated.

Further, each of the exemplary systems and methods has a plurality of elements in each element type. For correct operation of the method without modification, this is in fact a requirement given that every connection must pass through that element. If that element is faulty, all (or most) connections will be released as the result of a fault and all devices will be identified as faulty. If another element is faulty, the single element will be identified as faulty even if it is not (i.e. it will have the same count values as the faulty element). However, again this can be overcome by identifying that there is a single element in an element type and modifying the method appropriately. For example, the method could be modified to identify that the single element in the element type is faulty if all elements have a ratio of 1. Further, any fault alarms received from the single element in the element type could be disregarded.

There are therefore described various methods of identifying one or more faulty elements in a network. The terms "network" and "system" are to be interpreted broadly, and in particular should be taken to mean any network, system or device comprising elements, resources, hardware, or components which are dynamically configurable into different functional paths or connections. Particular examples include telecommunications networks, comprising network elements such as radio base stations, radio network controllers, user equipment, etc; computer networks for computers; and even computers themselves, wherein the elements correspond to individual hardware components inside the computer.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The skilled person will recognise that the above-described apparatus and methods may be embodied as processor control code, for example on a carrier medium such as a disk, CD- or DVD-ROM, programmed memory such as read only memory (firmware), or on a data carrier such as an optical or electrical signal carrier. For many applications, embodiments of the invention will be implemented on a DSP (digital signal processor), ASIC (application specific integrated circuit) or FPGA (field programmable gate array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (very high speed integrated circuit hardware description language). As the skilled person will appreciate, the code may be distributed between a plurality of coupled components in communication with one another. Where appropriate, the embodiments may also be implemented using code running on a field-(re-)programmable analogue array or similar device in order to configure analogue/digital hardware.

The invention claimed is:

1. A method of detecting a faulty network element in a network, the network comprising at least a plurality of first network elements having a first network element type, and at least a plurality of second network elements having a second network element type, the method comprising:
   a) selecting one of the plurality of first network elements and one of the plurality of second network elements;
   b) attempting to set up a connection between said selected first network element and said selected second network element;
   c) repeating steps a) and b) for further selected first and second network elements;
   d) for each of the plurality of first network elements and for each of the plurality of second network elements, counting a number of connections that are released as a result of a fault;
      for each of the plurality of first network elements and for each of the plurality of second network elements, counting a total number of released connections; and
   e) for a particular one of the first or second network elements:
      self-determining a ratio of connections released in said particular network element as a result of a fault to total released connections in said particular network element; and
      based on said ratio, self-determining whether said particular network element is faulty.

2. A method as claimed in claim 1, step e) further comprising:
   in response to when said ratio is higher than a threshold value, determining that said particular network element is faulty.

3. A method as claimed in claim 2, step e) further comprising:
   only determining that said particular network element is faulty in response to when said total number of released connections is greater than a second threshold value.

4. A method as claimed in claim 1, step e) further comprising:
   in response to when said ratio is equal to 1, determining that said particular network element is faulty.

5. A method as claimed in claim 1, wherein said selected first network element and said selected second network element are selected randomly.

6. A method as claimed in claim 1, wherein said selected first network element and said selected second network element are selected according to a predetermined selection pattern, wherein said predetermined selection pattern ensures that each of the plurality of first network elements and each of the plurality of second network elements are selected a substantially equal number of times.

7. A method as claimed in claim 1, wherein said network further comprises a plurality of third network elements having a third network element type, and wherein:
   step a) further comprising:
      selecting a random one of the plurality of third network elements;
   step b) further comprising:
      attempting to set up a connection between said random first network element, said random second network element and said random third network element;
   step c) further comprising:
      repeating steps a) and b) for further randomly selected first, second and third network elements;
   step d) further comprising:
      for each of the plurality of third network elements, counting a number of connections that are released as the result of a fault; and
   step e) further comprising:
      for a particular one of the first, second, or third network elements, on the basis of said number of connections that are released in said particular network element as a result of a fault, determining whether said particular network element is faulty.

8. A method as claimed in claim 1, wherein step d) is performed in a central management node of the network.

9. A method as claimed in claim 8, further comprising:
   from each network element, in response to when a connection is released as the result of a fault, signalling this fact to the central management node.

10. A method as claimed in claim 8, further comprising:
    from each network element, signalling to the central management node the present number of connections that are released as the result of a fault.

11. A method as claimed in claim 1, wherein step d) is performed in each respective network element.

12. A method as claimed in claim 1, wherein said network is a computer, and wherein said network elements are hardware elements in the computer.

13. A method as claimed in claim 1, wherein said network is a computer network, and wherein said method is performed in said computer network.

14. A method as claimed in claim 1,
    wherein said network comprises a multi-standard base station in a telecommunications network,
    wherein said first and second network elements comprise elements of the multi-standard base station, and
    wherein determining whether said particular network element is faulty comprises determining whether said particular network element of the multi-standard base station is faulty in response to said number of connections that are released in said particular network element of the multi-standard base station as a result of a fault.

15. A network element that is configured to perform the method according to claim 1.

16. A management node that is configured to perform the method according to claim 1.

17. A computer program product, comprising a non-transitory computer readable storage medium including executable code for performing the method according to claim 1.

* * * * *